Figure 1:
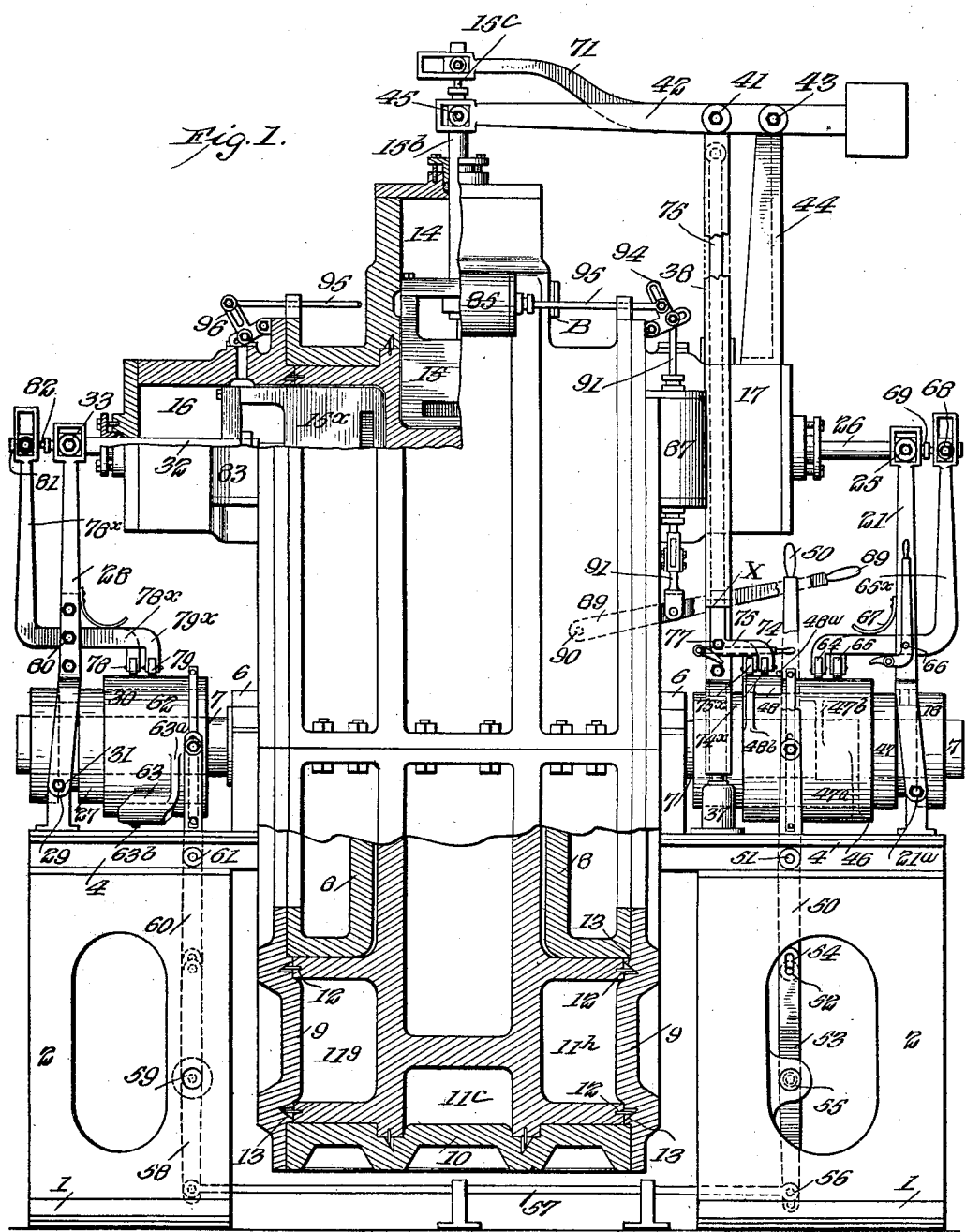

T. IDZAL.
ROTARY ENGINE.
APPLICATION FILED DEC. 12, 1910.

999,650.

Patented Aug. 1, 1911.
6 SHEETS—SHEET 1.

WITNESSES:
E. M. Callaghan
L. A. Stanley

INVENTOR
THORE IDZAL
BY Munn & Co.
ATTORNEYS

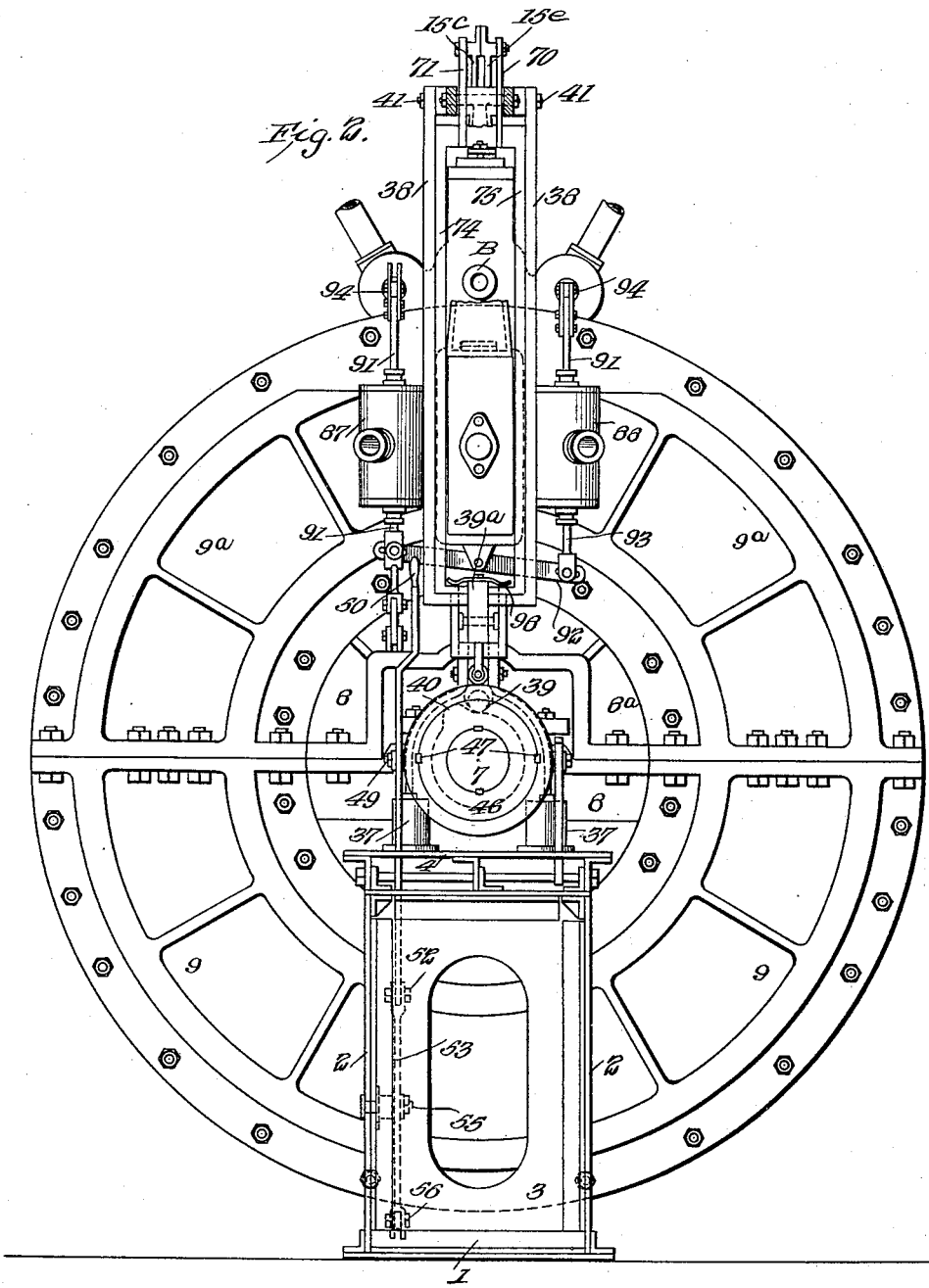

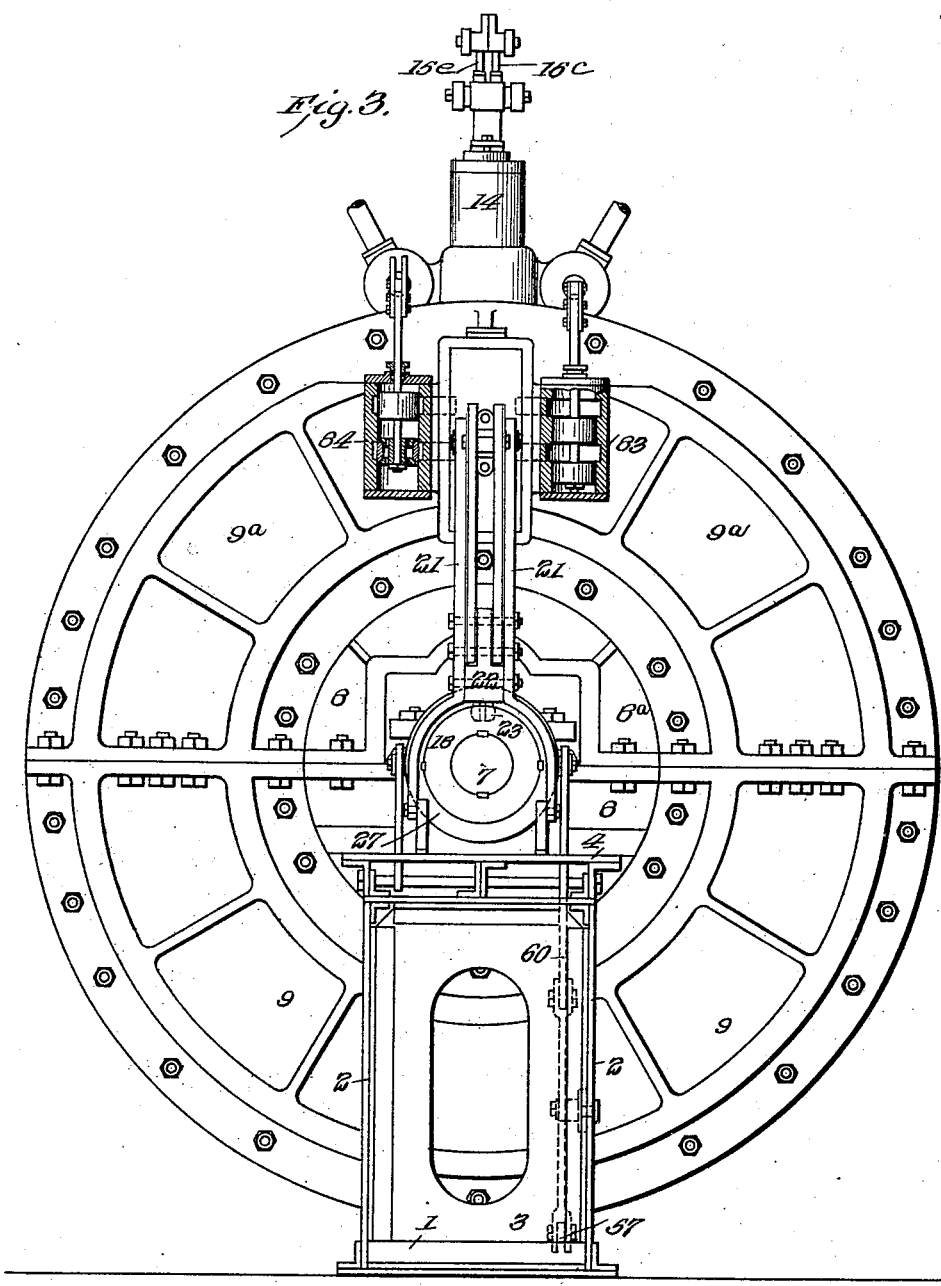

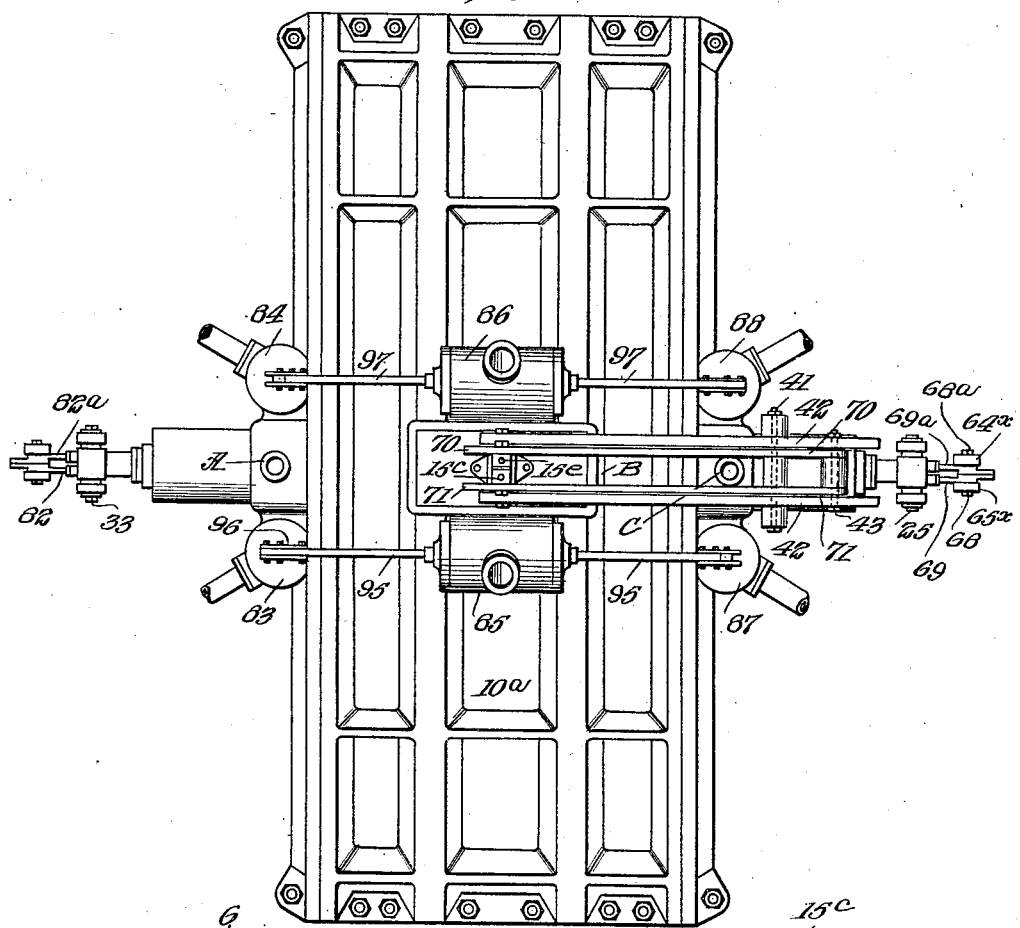

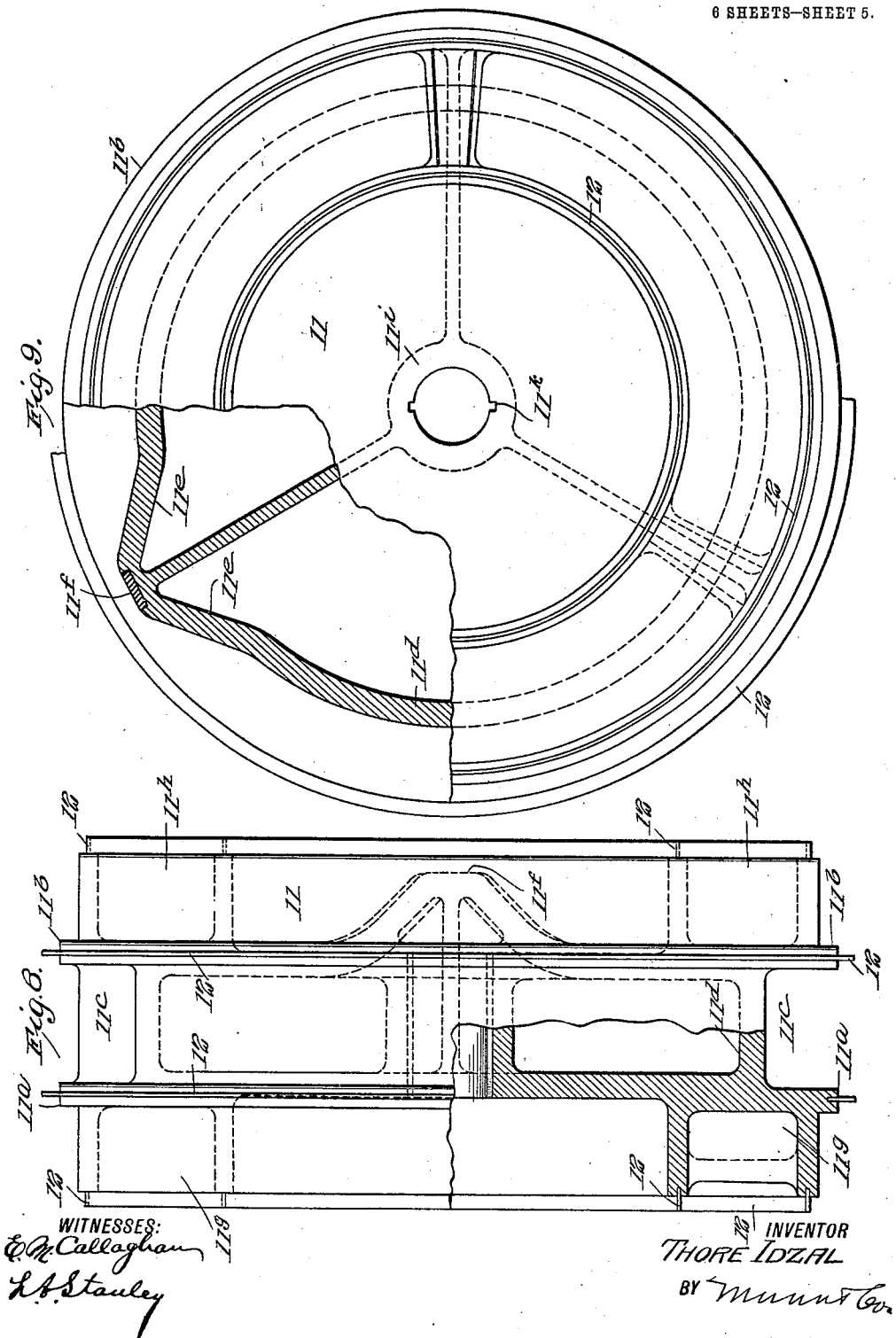

T. IDZAL.
ROTARY ENGINE.
APPLICATION FILED DEC. 12, 1910.
999,650.
Patented Aug. 1, 1911.
6 SHEETS—SHEET 6.
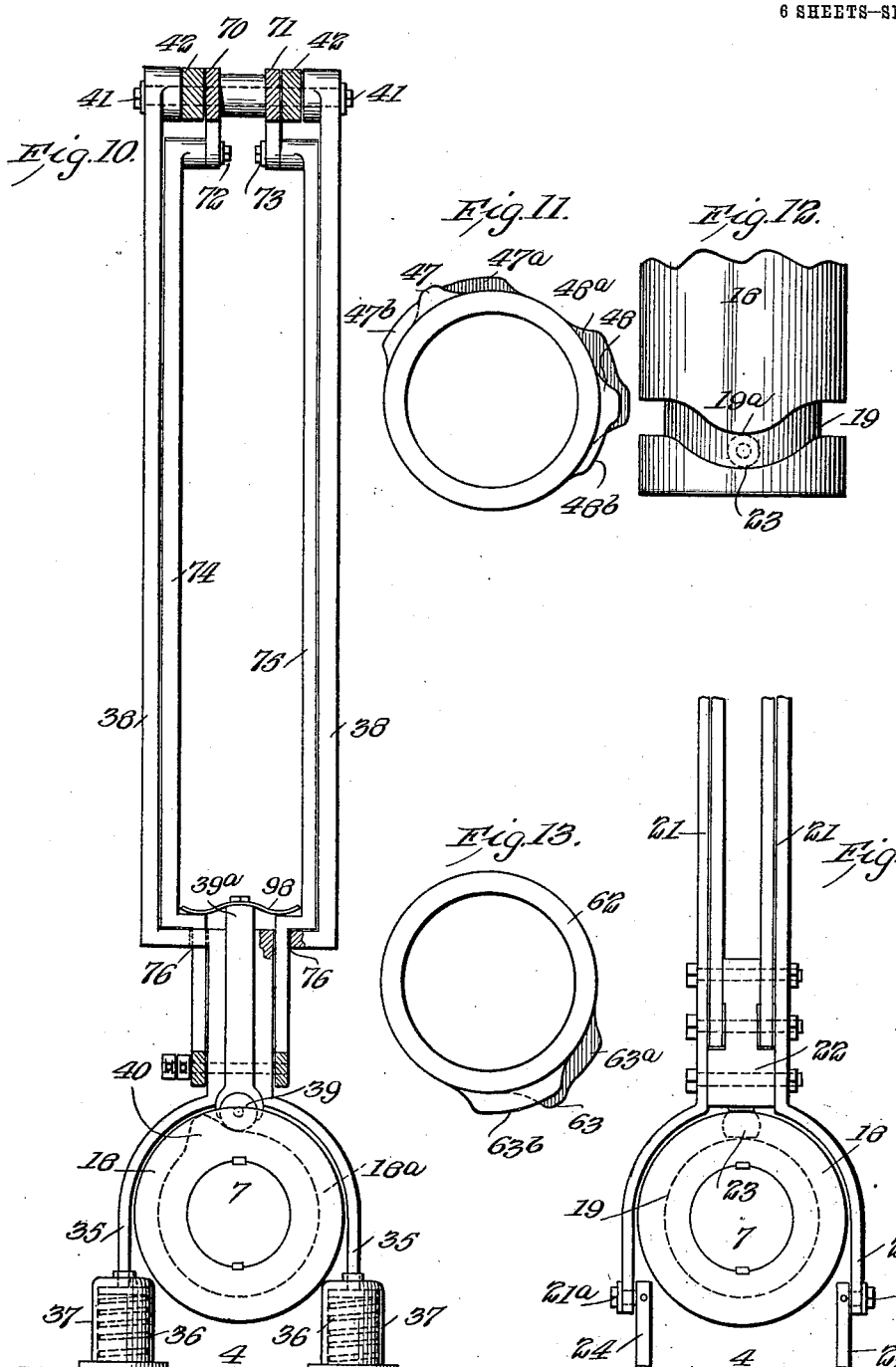
WITNESSES:
E. M. Callaghan
L. B. Stanley
INVENTOR
THORE IDZAL
BY Munn & Co.
ATTORNEYS

UNITED STATES PATENT OFFICE.

THORE IDZAL, OF CAMDEN, NEW JERSEY.

ROTARY ENGINE.

999,650.  Specification of Letters Patent.  Patented Aug. 1, 1911.

Application filed December 12, 1910. Serial No. 596,840.

*To all whom it may concern:*

Be it known that I, THORE IDZAL, a citizen of the United States, and a resident of Camden, in the county of Camden and State of New Jersey, have made certain new and useful Improvements in Rotary Engines, of which the following is a specification.

My invention relates to improvements in rotary engines, and it consists in the combinations, constructions and arrangements herein described and claimed.

An object of my invention is to provide a novel form of engine in which a single rotary piston is acted on at several points in its rotation by the admission of fresh steam.

A further object of my invention is to provide means for operating the abutment valves, so as to insure the greatest economy in the workings of the engine.

A further object of my invention is to provide a novel form of abutment valve itself.

A further object of my invention is to provide means for controlling the exhaust ports. This I accomplish by a series of valves whose positions may be simultaneously adjusted by manipulation of a single lever.

A further object of my invention is to provide means for regulating the steam inlet.

A further object of my invention is to provide a device which is compact, and which will make use of a motive fluid in the most efficient manner, thereby decreasing the cost of maintenance and providing an engine of high power, which takes up comparatively little room.

A further object of my invention is to provide means for reversing the engine.

Other objects and advantages will appear in the following specification and the novel features of the device will be particularly pointed out in the appended claims.

My invention is illustrated in the accompanying drawings forming part of this application in which—

Figure 1 is a side elevation, certain parts being shown in section for the sake of clearness, Fig. 2 is a view of the right end of the device, shown in Fig. 1, Fig. 3 is a view of the left end of the device shown in Fig. 1, certain parts being shown in section, Fig. 4 is a plan view of the device, Fig. 5 is a detail side view showing one of the abutment valves, Fig. 6 is a sectional view of the abutment valve on the line 6—6 of Fig. 5, Fig. 7 is a detail perspective view of one of the slide valves carried by the abutment valve, Fig. 8 is an edge view of the rotary piston, certain parts being shown in section, Fig. 9 is a face view of the rotary piston, certain parts being shown in section, Fig. 10 is a detail view of the cam levers for operating the abutment valve and slide valves within said abutment valve, Fig. 11 is an end view of one of the sliding cam sleeves, Fig. 12 is a plan view showing one end of a cam drum, Fig. 13 is an end view of another cam sleeve, and Fig. 14 is a view of the end of one of the cam drums, showing its connection with the slide and abutment valve operating levers.

In carrying out my invention, I have provided end supporting frames, each consisting of a base 1, sides 2, the ends 3, and the tops 4. In Figs. 1, 2 and 3, I have shown the main casing or cylinder, consisting of the integral central end members 8, and $8^a$, the integral members 9, and $9^a$, and the peripheral rings 10 and $10^a$. These parts bolted together form the main casing or cylinder. The central part of the end member 8 forms the lower part of the bearing for the main shaft 7 the upper part of the bearing is shown at 6 in Fig. 1. The main shaft 7 extends through the device and is on one or both ends connected with the driving shaft (not shown). The extensions 9 are secured to the side members 8 and between the extensions 9, on opposite sides, is a peripheral ring 10, the latter, of course, being made up in sections bolted together. This forms the main cylinder as stated. Within this main cylinder is a rotary piston or power wheel 11, such as that shown in Figs. 8 and 9. From an inspection of Figs. 8 and 9, it will be seen that this wheel is divided into three parts by the peripheral flanges $11^a$ and $11^b$. From an inspection of the bottom of Fig. 8, it will be apparent that there is an annular chamber $11^c$, which extends around the periphery of the wheel. A portion of this chamber is formed by a connecting strip $11^d$. The strip $11^d$ of the chamber $11^c$ has an outward and then an inward bend, as shown at $11^e$. The top of this crest or bend 11ᵉ forms a shoe 11ᶠ, which may be provided with a resilient wearing member, as shown in Fig. 9.

On the opposite side of the partition or flange 11ᵃ from the chamber 11ᵉ is an annular chamber 11ᵍ, while in the position corresponding with the annular chamber 11ᵍ on the exterior of the partition 11ᵇ is an annular chamber 11ʰ. The annular chambers 11ᵍ and 11ʰ each have a shoe like that in the chamber 11ᵉ. One of these shoes 11ᶠ is shown in dotted lines in Fig. 8 in the chamber 11ʰ. From the description given above, it will be seen that the piston is an integral wheel provided with three parallel annular chambers, the central one of said chambers having a shoe extending in a radial direction from the center of the wheel, while the two outer chambers have their shoes extending in opposite directions parallel with the axis of the wheel, each of these shoes being at an angle to the adjacent shoes. The wheel or rotary piston just described is provided with a hub 11ⁱ (see Fig. 9) having a key-way 11ᵏ, and is designed to be keyed to the main shaft 7 within the main cylinder or casing. In order to make the piston steam-tight, I provide the metallic packing rings 12 (see Figs. 1 and 8). These are held in grooves in the edges of the piston, which abut the casing and bear against the casing in recesses 13.

Referring now to Fig. 1, it will be seen that the upper part 10ᵃ of the circumferential ring 10 and 10ᵃ has an extension to provide a valve chamber 14. Within this valve chamber is disposed an abutment valve 15 of the form shown in Figs. 5 and 6. The upper part 9ᵃ of the circular outer sides of the main casing are also extended in opposite directions to provide similar valve chambers 16 and 17, respectively. In Fig. 1 the upper left-hand corner is cut away so as to show the interior of the valve casings 14 and 16, the valve casing 17 being similar to the valve casing 16. All three of the valves 15, 15ˣ and 15ʸ are similar in construction, and a description of one will suffice therefore for all. Referring then to Fig. 5, it will be seen that I have provided a hollow abutment valve consisting of an outer frame having extensions 15ᵃ to which is secured a stem 15ᵇ. Through the sleeve runs a pair of rods, one 15ᶜ which is secured to a slide valve 15ᵈ, and the other 15ᵉ being secured to a similar slide valve 15ᶠ. The slide valves 15ᵈ and 15ᶠ are of the shape shown in Fig. 7. It may be stated at this point that these abutment valves are designed normally to be in the position of the valve 15 in Fig. 1, and to be raised to allow the shoe 11ᶠ of the piston 11 to pass, in the manner hereinafter described.

The means for operating the valves consist of the following parts: Referring now to Fig. 1, it will be seen that I have provided a drum 18, which is secured to the shaft 7 and rotates therewith. This drum is set forth in detail in Fig. 12. It is provided with a cam slot 19. Arranged to straddle the drum 18 is a yoke 20 on the end of a lever 21, which consists of two portions secured together with a spacing member 22. The latter carries a cam roller 23, which engages in the groove 19, so as to move the lever as the drum rotates. The yoke 20 is pivotally mounted at its lower end upon supports 24 carried by the frame top 4. The upper part of the lever 21 is pivotally connected at 25 with the hollow rod 26, leading into the valve casing 17. The hollow rod 26 is precisely similar to the hollow rod 15ᵇ, which has been described, and which is illustrated in Fig. 5. The abutment valve in the valve casing 17 will be reciprocated by the movement of the drum 18 into and out of the path of the shoe 11ᶠ in the chamber 11ʰ. The movement of the abutment valve 16 is accomplished in a similar manner. A drum 27 is provided on the opposite end of the shaft from the drum 18, and the lever 28, which is pivoted at 29 and which bears a cam member 30 arranged to enter a cam groove 31 in the drum 27, causes the lever to reciprocate the valve 15ˣ, which is attached to the valve stem 32, the latter being pivotally connected with the lever 28 at 33.

The means by which the valve 15 is reciprocated into and out of the central chamber 11ᵉ is as follows: Referring to Figs. 1 and 10, it will be seen that I have extended the drum 18 and have provided it with a groove 18ᵃ (see Fig. 10.) In this groove there is a cam member 40. The drum 18 is straddled at this point by a yoke 35, the ends of the yoke resting on springs 36 in the housings 37. The yoke is secured to and forms an integral extension of the rods 38. The latter bear a cam roller 39 which is arranged to be engaged by a cam member 40 on the drum 18, so as to lift the arms 38 once during every revolution of the drum. The member 18 is keyed to the shaft 7, as stated. The upper ends of the rods 38 are pivotally connected at 41 to a lever 42. This lever is fulcrumed at 43 to a bracket 44, and its opposite end is pivotally connected at 45 to the hollow valve rod 15ᵇ. The lever 42 constitutes a lever of the third class, so that a very slight movement of the rods 38 will cause a greater movement of the valve 15. The foregoing description has included means for moving the three abutment valves in the valve casings 14, 16 and 17. I will now explain the means for shifting the slide valves within the abutment valves.

Referring now to Fig. 1, it will be seen that I have provided a sleeve 46 which is disposed on the drum 18, being keyed thereto so as to slide longitudinally on the drum, as shown at 47 (see Fig. 3). The cam sleeve is provided with a large cam 47 having extensions $47^a$ and $47^b$ at opposite ends thereof. The sleeve 46 is also provided with a cam 48 having extensions $48^a$ and $48^b$. Pivotally connected at 49 to the slidable sleeve 46 is a lever 50. The latter is pivoted to the frame at 51. The lever 50 is pivotally connected at 52 with a lever 53, which is slotted at 54 and which is pivoted at 55 to the frame. The lower end of the lever 53 is slotted, and is pivotally connected at 56 with a pull rod 57. This pull rod in its turn is pivotally connected with a lever 58 similar to the lever 53 pivoted on the frame at 59. The lever 58 in turn is connected with a lever 60 pivoted on the frame at 61 and having its upper end pivotally connected with a slidable sleeve 62, disposed on the drum 27. The latter is provided with a cam 63 having extensions $63^a$ and $63^b$, similar to the cams 47 and 48 on the sleeve 46. It will be obvious that both sleeves 46 and 62 may be shifted in the same operation to the same extent by a movement of the lever 50. The purpose of this simultaneous shifting of the sleeves will appear later.

Referring again to Fig. 1, it will be seen that I have provided two cam rollers 64 and 65, respectively, disposed on the ends of levers $64^x$ and $65^x$, respectively. In Fig. 1, the lever $65^x$ partly obscures the lever $64^x$, but the latter is similar in form to the lever $65^x$. The lever $65^x$ is pivotally connected to one side to the two-part rod 21 at 66 and the roller 65 is normally held against the sleeve 46 by means of a spring 67. The upper end of the lever $65^x$ is pivotally connected at 68 to a rod 69, which extends through the hollow rod 26, and which is similar in every respect to rod $15^c$, shown in Fig. 6, it being understood that the hollow rod 26 is similar to the hollow rod $15^b$ which contains the rods $15^c$ and $15^e$. Similarly the lever $64^x$ is pivotally connected at $68^a$ to a rod $69^a$, which is similar in every respect to the rod $15^e$ in Fig. 6.

Referring now to Fig. 10, it will be seen that pivotally mounted on the bolt 41 between the two sides of the lever 42, are the bell-crank levers 70 and 71. The upper ends of these levers are plainly shown in Fig. 4. In Fig. 1, I have shown the lever 71 as being pivotally connected with the rod $15^c$, the other lever 70 being pivotally connected with the rod $15^e$. The lower ends of the bell-crank levers 70 and 71 are pivotally connected at 72 and 73 respectively with the downwardly extending levers 74 and 75. The latter lie between the double arms 38. They pass through slots 76 in the latter. The lower ends of the levers 74 and 75 are bent at about points 77, and are provided with the respective cam rollers $74^x$ and $75^x$, which bear on the cam drum 46. It will be obvious from the foregoing description that when a cam comes underneath one of the rollers $74^x$ or $75^x$, the lever bearing the roller will be raised, and that the corresponding lever 70 or 71 will be raised, thereby raising the slide valve $15^d$ or $15^f$, as the case may be (see Fig. 7) so as to uncover their respective ports $15^x$ and $15^y$. The levers 74 and 75 are held in their normal position by the spring 98.

The mechanism for operating the slide valves in the valve casing 16 is precisely similar to that for operating the valves in the valve casing 17, namely: two rollers 78 and 79 upon their respective levers $78^x$ and $79^x$. These levers are pivoted at 80 to the two-part rod 28, and their upper ends are pivotally connected at 81 with the stems 82 and $82^a$ leading to the slide valves which correspond to the slide valves $15^d$ and $15^f$ in Fig. 6.

The valves for regulating the exhaust of the engine are shown in detail in Fig. 3. These valves are contained in the six valve casings 83, 84, 85, 86, 87 and 88, shown in Fig. 4. In Fig. 3 I have shown sections of valves 83 and 84. Each valve casing has a valve rod with two plunger heads to close or open the exhaust ports. The valves may all be shifted simultaneously by means of the lever mechanism. Thus in Fig. 1, I have shown a hand lever 89, which is pivoted at 90 to the casing and which is pivotally connected with the valve stem 91 of the valves in the casing 87. The valve stem 91 is pivotally connected by the first class lever 92 to the valve stem 93 of the valves in casing 88 (see Fig. 2). It will, therefore, be apparent that by pulling downwardly on the lever 89 the valves in casing 87 will be shifted downwardly, while the valves in the casing 88 on the other side will be shifted upwardly. In other words, the valves on the opposite sides of the center will be set in opposite positions. Referring again to Fig. 1 it will be seen that there is a lever 94 which is shifted by the rod 91, and which in turn shifts the valve rod 95 of the valves in the chamber 85. This valve stem 95 extends on through the valve chamber 85 and connects with the lever 96 which is similar to the lever 94, and which in turn operates the valves of the cylinder 83 (see Fig. 4). On the other side of the center, the valves in the casings 86, 88 and 84 are operated by means of the valve stem 97 in the opposite direction, as already explained.

In Fig. 4, I have shown the three steam inlets A, B and C, corresponding to the three chambers $11^g$, $11^c$ and $11^h$. Obviously these three inlets could be connected to a single supply pipe, and be controlled by a single stop cock (not shown).

From the foregoing description of the various parts of the device, the operation thereof may be readily understood.

Let us suppose that we wish to start the engine, so as to run to the right. The lever 89 is shifted upwardly, so as to set the valves in the cylinders 83, 85 and 87 in their upper position, and the valves in the cylinders 82, 84, 86 and 88 in their lower positions. The left-hand side of the chambers will then be in communication with the condenser. The cam sleeves 46 and 62 are then set by the lever 50 in the position shown in Fig. 1. Steam is now admitted to the three chambers 14, 16 and 17. Suppose we have a vacuum in the condenser, the vacuum will then give the wheel 11 a motion to the right, but as the rotary wheel starts to move to the right the cam 40 (see Fig. 10) will strike the cam member 39 carried by the bar $39^a$, which is secured at 77 to the double rod 38. The upward movement of the rod 38 (see Fig. 1) through its connection with the double rod 42 will cause the raising of the abutment valve stem $15^b$ and the consequent shifting of the abutment valve 15 to clear the central shoe $11^f$ in the central recess or chamber $11^c$. When the cam 40 passes from beneath the roller 39, the latter will return to its original position and the abutment valve 15 will be lowered again. At the time that the cam 40 engages the roller 39, the roller $75^x$ will engage the cam 48, and will be given the same upward motion as the rod 38, and will give the lever 71 and the valve stem $15^c$, which is connected with the lever 71, the same movement as the lever 42 and the hollow valve stem $15^b$. The flat slide valve $15^d$ will, therefore, follow the abutment valve on its way up and also for a certain distance on its way down, but since the cam 48 has an extension $48^b$ in line with the roller $75^x$, the slide valve $15^d$ will be kept from descending while the abutment valve is still moving downward. This will admit steam through the opening $15^x$ as long as the roller $75^x$ is on the cam extension $48^b$. At the end of this extension, when the roller returns to the face of the cam sleeve, the spring 98 (see Fig. 10) will return the rod 75 to its original position, thereby closing the slide valve $15^d$ and shutting off the steam. The steam will expand and press against the shoe $11^f$, thereby forcing the wheel around. On the opposite side of the shoe there is a vacuum. When the wheel has turned through an angle, the roller in the slot 19 at the bottom of the rod 21, reaches the curved portion of the cam slot 19, shown at $19^a$ in Fig. 12. This causes an outward movement of the arm 21, which, as shown in Figs. 1 and 14, is pivoted at $21^a$. This causes the abutment valve in the chamber 17 to be moved outwardly through the connection of the rod 21 with the valve stem 26. The abutment valve, therefore, in the casing 17 is moved outwardly to clear the shoe $11^f$ in the chamber $11^h$. At the same time, the roller 64 on the end of the lever $64^x$ strikes the cam 47, thereby drawing out the slide valve corresponding to the slide $15^b$ in Fig. 6. As in the explanation of the operation of the abutment valve 15 this slide valve will remain open, owing to the cam extension $47^b$, but will by the spring 67 be brought back to its original position as soon as the roller 64 leaves the extension. In precisely the same way, when the cam roller 30 in the cam slot 31 of the drum 27 moves the rod 28, the abutment valve $15^x$ in the chamber 16 will be shifted to clear its respective shoe, and the slide valves will also be shifted with it, and one will remain open after the abutment valve descends to permit the entrance of steam in precisely the same manner as with the abutment valves described before, this movement being caused by the engagement of the roller 78 with the cam 63, and the consequent shifting of the arm $78^x$, which connects with the slide valve.

It should now be plain why the cam drums are shifted. It will be observed that the extensions of the cams 47 and 63 are at opposite ends and at opposite sides. These extensions can be so shifted that when the drums are rotating in one direction the main portion of the cam will engage a roller which will also be engaged by the extension of the cam, the other roller riding off the main portion of the cam without engaging the extension, but when the wheel is rotating in the opposite direction, as stated, the sleeves may be shifted so as to bring the other roller into play, thereby operating the companion slide valve in each of the abutment valves. In other words, when the wheel is rotating in one direction, one set of the slide valves, say those corresponding to $15^d$ in Fig. 6, will be operated by the cam rollers, and when the wheel is rotating in the opposite direction, the other set of slide valves, corresponding to the slide valve $15^f$ will be operated to admit the steam at the proper time and for the proper duration. The slide valves can also be worked by the levers $99^x$, $99^y$ and $100^x$, $100^y$, thus facilitating the starting of the engine (see drawings). In order to reverse the engine, it is only necessary to first reverse the position of the exhaust valves by shifting the lever 89 downwardly, and then shifting the cam sleeves 46 and 62, so that the rollers will now operate the set of slide valves corresponding to $15^f$. The extensions of the cams 47, 48 and 62 will now operate their respective rollers to admit or to shut off steam from the steam ports corresponding to $15^y$ in Fig. 6.

It will thus be seen that I have provided a device in which the motive fluid may be delivered to the wheel at various points in its revolution. Obviously, the number might be extended by adding more chambers to the main wheel with a corresponding number of abutment valves and devices for manipulating them, but such changes I regard as mere modifications, which fall within the scope and the spirit of the invention.

I claim:—

1. In a rotary engine, a frame, a casing secured to said frame, a rotary piston having a plurality of annular chambers mounted for rotation within said casing, a shoe carried by said piston within each of said chambers, a hollow abutment valve arranged to reciprocate into and out of the path of each of said shoes, means for delivering steam into the interior of said abutment valve, and a slide valve carried by each abutment valve for regulating the admission of steam into said annular chamber.

2. In a rotary engine, a frame, a casing secured to said frame, a rotary piston having a plurality of annular chambers mounted for rotation within said casing, a shoe carried by said piston within each of said chambers, a hollow abutment valve arranged to reciprocate into and out of the path of each of said shoes, means for delivering steam into the interior of said abutment valve, a pair of slide valves within each abutment valve for delivering steam into said annular chamber, and means for operating either of said slide valves.

3. In a rotary engine, a frame, a casing secured to said frame, a rotary piston having a plurality of annular chambers mounted for rotation within said casing, a shoe carried by said piston within each of said chambers, a hollow abutment valve arranged to reciprocate into and out of the path of each of said shoes, means for delivering steam into the interior of said abutment valve, a pair of slide valves within each abutment valve for delivering steam into said annular chamber, means for operating either of said slide valves, said means comprising cam members adapted to be actuated by the movement of the rotary piston shaft, and lever connections between said cam members and said slide valves.

4. In a rotary engine, a rotary piston or wheel having a plurality of annular chambers, a shaft for said piston, cam drums disposed on said shaft and provided with cams, an abutment valve for each of said annular chambers, bell-crank levers provided with cam rollers arranged to be engaged by the cams on said cam drums, and connections between said bell-crank levers and said abutment valves for reciprocating the latter into and out of their respective annular chambers.

5. In a rotary engine, a frame, a rotary piston or wheel mounted within said frame, said wheel having a central annular chamber and two side annular chambers having a shoe within each chamber, the shoe in the central chamber being disposed at an angle from the shoes in the side chambers and the shoe in one side chamber being disposed at an angle from the shoe in the other side chamber, a reciprocating abutment valve for each chamber, said abutment valves being disposed in a plane radial to the axis of the rotary wheel, means for reciprocating the side abutment valves in a direction parallel with the axis of the rotary wheel, and means for reciprocating the central abutment valve in a direction at right angles to the direction of movement of the side abutment valves.

6. In a rotary engine, a rotary piston having a plurality of chambers, and having a shoe in each of said chambers, an abutment valve arranged to reciprocate into and out of each of said chambers, a pair of slide valves carried by each of said abutment valves, a main shaft for said rotary piston, a cam drum at each end of said shaft, a cam sleeve disposed on each of said drums, means operated by the cam sleeves for actuating the slide valves, and means operated by the drums for actuating the abutment valves.

7. In a rotary engine, a rotary piston having a plurality of chambers, and having a shoe in each of said chambers, an abutment valve arranged to reciprocate into and out of each of said chambers, a pair of slide valves carried by each of said abutment valves, a main shaft for said rotary piston, a cam drum at each end of said shaft, a cam sleeve disposed on each of said drums, means operated by the cam sleeves for actuating the slide valves, means operated by the drums for actuating the abutment valves, and means for simultaneously shifting said cam sleeves.

THORE IDZAL.

Witnesses:
HOWARD F. LUPTON,
CHARLES S. ACKLEY.

---

Copies of this patent may be obtained for five cents each, by addressing the "Commissioner of Patents, Washington, D. C."